Oct. 30, 1962   R. O. MAZE   3,060,736
MASS RATE FLOW METER
Filed July 1, 1957   2 Sheets-Sheet 1

INVENTOR.
ROBERT O. MAZE
BY

Oct. 30, 1962  R. O. MAZE  3,060,736
MASS RATE FLOW METER

Filed July 1, 1957  2 Sheets-Sheet 2

INVENTOR.
ROBERT O. MAZE
BY

United States Patent Office 3,060,736
Patented Oct. 30, 1962

3,060,736
MASS RATE FLOW METER
Robert O. Maze, St. Paul, Minn., assignor to Minneapolis-Honeywell Regulator Company, Minneapolis, Minn., a corporation of Delaware
Filed July 1, 1957, Ser. No. 669,084
5 Claims. (Cl. 73—194)

The present invention relates to flow measurement and more particularly to an improved method of determining mass rate of flow.

In the present art there are several types of mass rate of flow meters which use the angular momentum principle but which have various disadvantages that the present invention overcomes. One such type of mass flow meter provides a constant speed motor driving an impeller in such a direction as to impart an angular velocity to the fluid passing through the impeller. This angular velocity exerts a torque upon a sensing device located downstream from the impeller which in turn rotates under the force of the angular momentum against a spring bias so that its position is a function of the mass rate of flow. An inherent disadvantage of this type of flow meter is that it becomes inaccurate at low flow rates because of extraneous torques which exert their influence. Another disadvantage is the relatively large power supply required to drive the impeller motor at constant speed. It is therefore a principal object of the present invention to provide an improved mass rate of flow meter.

Briefly the present invention is drawn to a system largely similar to that described above but with the difference that a variable speed motor is used to drive the impeller and a rebalance network is employed whereby the torque sensed by the sensor is maintained constant and the speed of the motor necessary to sustain this constant torque is used to indicate mass rate of flow. Indication of the mass rate of flow is accomplished when the motor is coupled to a velocity generator or a tachometer and an indicator.

The principle of operation of the angular momentum type true mass flow meter is well known in the art. An impeller imparts an angular momentum to a fluid being measured. The rate of change of angular momentum of the fluid is proportional to the impeller's velocity and to the mass rate of flow. A torque sensor downstream from the impeller responds to the angular momentum from the fluid. The torque on the sensor is then proportional to the mass rate of flow and the angular velocity of the fluid. This may be shown in equation form as:

$$T = KQW_s$$

where T is the torque on the sensor, Q is the mass rate of flow, $W_s$ is the angular velocity imparted to the fluid by the impeller, and K is a constant of proportionality. This may be written:

$$\frac{KW_s}{T} = \frac{1}{Q}$$

Now if the torque on the sensor is kept constant, then it is seen that the angular velocity $W_s$ is proportional to the reciprocal of mass rate of flow.

The advantages of this over past methods of operation will be more clearly understood from an examination of the specification and drawings connected herewith, in which.

Figure 1:
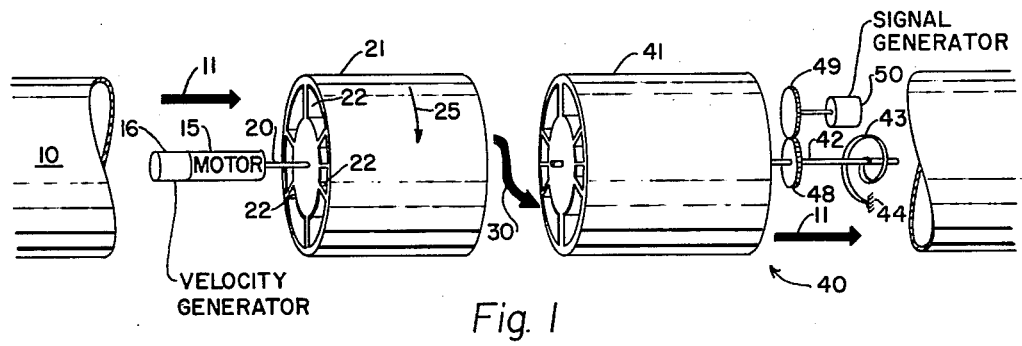
FIGURE 1 illustrates a pictorial and partially sectionalized side view of one embodiment of the mass flow meter.

Referring now to FIGURE 1, numeral 10 represents a section of pipe through which a fluid is flowing in a direction shown by the arrows 11. A variable speed motor 15 is mounted within tube 10 by any suitable means and drives a velocity generator 16. Velocity generator 16 may be of the type shown in Riggs Patent 2,206,920 issued July 9, 1940. The output shaft 20 of motor 15 also drives an impeller 21 which may be of any suitable form but which, for convenience, has been shown as having a plurality of radial extensions 22 which serve to impart a velocity to the fluid in a direction perpendicular to the flow direction 11. Shaft 20 and impeller 21 are assumed for the purpose of this disclosure to be rotating in a direction shown by the arrow 25 and hence the fluid passing through the opening between the partitions or extensions 22 will be given an acceleration which at the upper part of the impeller, will be towards the reader. While this is the preferred form of impeller, any adjustable impeller that will give a rotational component to flowing fluid may be used.

The fluid as it passes through the impeller, having both an angular and linear velocity, will follow a path shown by the arrow 30.

A torque sensor which is generally shown by arrow 40 is mounted by any suitable method in a position downstream from the impeller 21. Torque sensor 40 can be of any suitable type but, for purposes of this discussion, is shown as comprising a turbine 41 resembling the impeller 21, a shaft 42 attached to turbine 41, and a biasing spring 43 attached to shaft 42 and to a fixed member 44. The fluid in flowing through the turbine exerts a force or torque upon the torque sensor which is proportional to the mass rate of flow and the angular velocity of the fluid as was explained above. This force exerted on the torque sensor tends to rotate the turbine 41 and shaft 42 in the same direction as the impeller 21 rotates. Spring 43 tends to restrain rotation of the turbine 41. The position of the shaft 42 and the turbine 41, when the force of the spring equals the torque on the shaft, is then a function of the mass rate of flow and angular velocity of the fluid. Any method of applying a restraining force or torque, which increases with angular displacement of the shaft 42 or turbine 41 will work equally well and the spring 43 is shown only as an example.

Also attached to shaft 42 is a gear 48 which cooperates with a gear 49 attached to the shaft of a signal generator such as potentiometer 50. Actually, the gears are not essential to the operation of the invention since the signal generator could be attached directly to the shaft 42. It is seen, that the position of the wiper of potentiometer 50 will be proportional to the position of shaft 42 which is proportional to the torque applied to the torque sensor 40 and hence the mass rate of flow and angular velocity of the fluid. It will be understood, that any kind of signal generator can be used that provides a signal proportional to angular motion of turbine 41. The signal produced by signal generator 50 is used to increase or decrease the speed of motor 15, in a manner to be described, so that a greater or lesser angular velocity is imparted to the fluid and the torque applied to torque sensor 40 is held constant.

The fluid, after leaving turbine 41, continues in generally the same direction it was going when it entered the impeller 21 since the rotational energy which was imparted to the fluid by the impeller 21 is lost in transferring this energy to the torque sensor 40.

Figure 2:
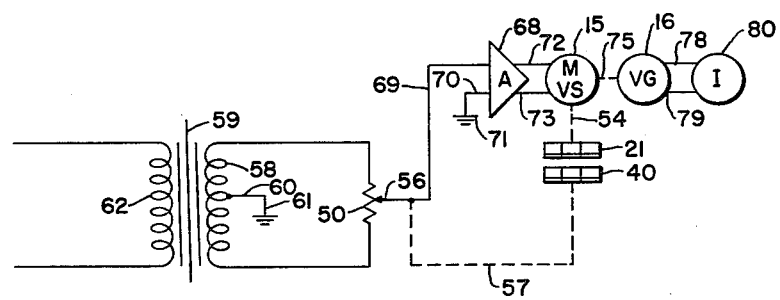
FIGURE 2 represents a schematic representation of the present invention.

In FIGURE 2 is shown a schematic drawing of various parts of the flow meter to show how indication of mass rate of flow is obtained. As stated above, the position of the wiper of potentiometer 50 is proportional to the torque exerted by the fluid upon the torque sensor 40. As also stated previously, the force or torque applied to torque sensor 40 is proportional to the mass rate of flow and the angular velocity of the fluid. It has been determined that to avoid the difficulties encountered in the past with flow meters wherein the impeller's velocity is kept constant, it is desirous to keep the torque applied to the torque sensor constant and allow the speed of the impeller to change, which will then be a function of mass rate of flow. When this is done, the motor speed is relatively greater at low flow velocities and hence the sensitivity is greater.

Referring now to FIGURE 2, the motor 15 is schematically shown as imparting driving force to the impeller 21 by a mechanical connection which is shown as dashed line 54. The impeller drives the torque sensor 40 through the fluid between impeller 21 and torque sensor 40. The output of the torque sensor 40 is mechanically connected to wiper 56 of potentiometer 50 by a mechanical connection shown as dashed line 57 which represents the shaft 42 and gears 48 and 49 in FIGURE 1.

Applied across potentiometer 50 is a voltage from a secondary winding 58 of a transformer 59 having a center tap 60 connected to ground connection 61. The primary winding 62 of transformer 59 is connected to a source of alternating current voltage (not shown). The output from potentiometer 50 is applied to an amplifier 68 by the following circuit; from ground connection 61 through a voltage rise in secondary 58, a voltage drop in potentiometer 50 to wiper 56, through conductor 69 to amplifier 68 and conductor 70 to ground connection 71. The spring 43 biases the torque sensor 40 to set the wiper 56 at some predetermined point away from the null position when the impeller 21 is not rotating. Any change in position of wiper 56 will change the signal to amplifier 68 and consequently any change in torque applied to torque sensor 40 will be represented by change in signal to amplifier 68. Therefore as the impeller 21 starts rotating and imparting a rotational torque to the torque sensor 40 through the rotational velocity of the fluid, the wiper 56 will proceed in a direction to reduce the input voltage to amplifier 68. The output of amplifier 68 is connected to the motor 15 by means of conductors 72 and 73 and drives the motor to keep the torque on torque sensor 40 constant after the system reaches equilibrium. Equilibrium occurs when the input to the amplifier 68 is the voltage needed to drive the motor 15 at a speed necessary to keep the torque sensor 40 at a substantially constant position and thus leave the wiper 56 substantially unchanged. Motor 15 is also connected to a source of reference voltage (not shown). A further change in torque at torque sensor 40 due to changing mass flow, will position wiper 56 to feed a signal into amplifier 68 which will cause the motor 15 to operate in a manner to bring the torque sensor 40 back to its substantially original position. This occurs because the amplifier has a very high gain and a very small change in the position of wiper 56 causes a large change in motor speed.

The speed of the motor 15 necessary to bring the system to balance is transmitted to the velocity generator 16 by a connection which is shown as mechanical connection 75. Velocity generator 16 is also connected to a source of reference voltage (not shown).

Figure 3:
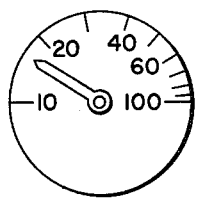
FIGURE 3 is a front view of one type of indicator used in the system.

The output of velocity generator 16 is of constant frequency and of magnitude dependent upon the speed of motor 15 which is, as shown above, proportional to mass rate of flow as long as the torque applied to torque sensor 40 remains constant. The torque applied to the torque sensor 40 is maintained constant by the control network which has been described and hence the output from the velocity generator 16 is proportional to mass rate of flow or more exactly, proportional to the reciprocal of mass rate of flow. A suitable electrical connection shown as conductors 78 and 79 extend from velocity generator 16 to an indicator 80 which may be of any suitable type and which may be calibrated to indicate directly units of mass rate of flow. Inasmuch as the output of velocity generator is in reality the reciprocal of mass rate of flow the calibration of indicator 80 may be in suitable units to show this reciprocal relationship. This can be done by using an indicator which has its dial calibrated as shown in FIGURE 3. These divisions are so spaced that an increment on the dial represents the reciprocal of an increment of input to the indicator.

An advantage to having the output of the measuring device indicative of the reciprocal of mass rate of flow becomes obvious when it is desired to compute the time remaining before fluid of a known quantity is completely spent. Such a use would be found on an aircraft where it is desired to know what flying time is left. Most aircraft have fuel measuring systems which give an output indicative of the amount of fuel in a container or fuel tank and if the present invention were utilized to give an output indicative of the mass rate of flow of fuel from the tank the two signals could be combined to give a signal proportional to amount of flying time left. This may be seen by considering the following:

$$\text{Time to go} = \frac{\text{amount of fuel remaining}}{\text{rate of fuel use}}$$

Mass rate of flow meters previously known in the art provide a signal proportional to mass rate of flow and hence this signal must be divided into the signal proportional to amount of fuel remaining. This requires a large amount of computing circuitry. By using the present invention, the signal proportional to the reciprocal of mass rate of flow may be multiplied by the signal proportional to amount of fuel remaining, and use of the complicated dividing circuitry is avoided.

Figure 7:
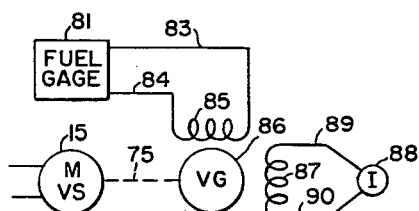
FIGURE 7 is a block diagram of the invention as used with a fuel gage system.

With reference to FIGURE 7, a fuel gauge circuit 81 which may be of the type shown in the Schaefer et al. Patent 2,563,280, has an output voltage of magnitude indicative of the mass of fuel remaining in the aircraft tanks. This output is fed by conductors 83 and 84 to a reference winding 85 of the velocity generator 16. Velocity generator 16 may be the same as in FIGURE 1 and has been given the same reference numeral for convenience. The speed of motor 15 is proportional to the reciprocal of mass rate of flow, as stated, and this speed is imparted to the rotor 86 of the velocity generator 16. The output voltage of velocity generator 16 is proportional to the magnitude of the reference voltage and the speed of the rotor and appears on output winding 87. Since the magnitude of the reference voltage is proportional to the mass M of fuel remaining and the speed of the rotor 86 is proportional to $1/Q$, the output voltage is proportional to $M/Q$ which is a function of time to go. This voltage is presented to an indicator 88 by conductors 89 and 90 to provide the operator with information on the amount of flying time remaining.

Figure 4:
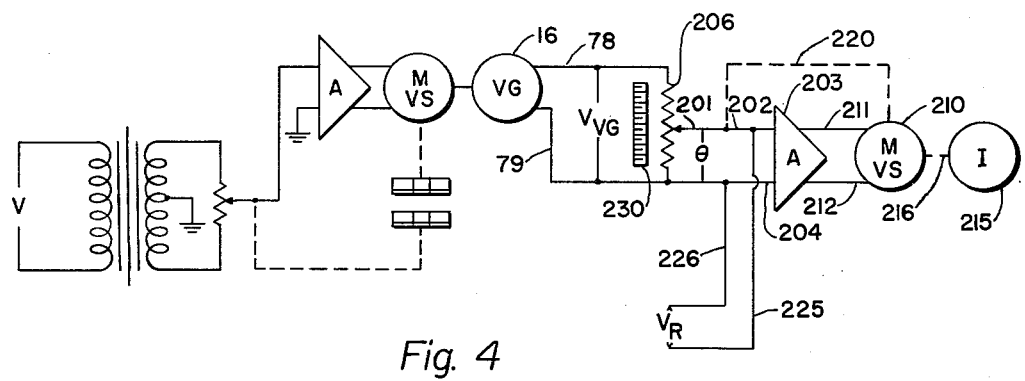
FIGURE 4 is a schematic representation of the invention wherein direct linear indication is obtained.

If it is desired to use a linear indicator, a system such as is shown in FIGURE 4 may be used. Referring to FIGURE 4 which is the same as FIGURE 2 with the exception that the following described circuit is inserted between the output of the velocity generator and the indicator. Conductors 78 and 79 coming from the velocity generator 16 are connected to the opposite ends of a potentiometer 206. A wiper 201 of potentiometer 206 is connected by conductor 202 to one terminal of the input of an amplifier 203. The other input of amplifier 203 is connected by means of conductor 204 to the connection between conductor 79 and potentiometer 206. Amplifier 203 is connected at its output to a motor 210 by conductors 211 and 212, the motor 210 being connected to a source of reference voltage (not shown). The amplifier 203 and motor 210 may be of the type shown in Upton Patent 2,423,534 issued July 8, 1947. The combination is phase sensitive so that motor 210 may rotate in either direction depending on the phase of the input signal. Motor 210 controls the position of an indicator 215 by a mechanical connection shown as dashed line 216 and at the same time controls the position of wiper 201 of potentiometer 206 by a mechanical connection shown as dashed line 220. A reference voltage $V_R$ having the same frequency as the output of velocity generator 16 is also connected to the input of amplifier 203 by conductors 225 and 226 connected to conductors 202 and 204 respectively. Appropriate summing resistors may be included with conductors 225 and 226 if necessary.

As was stated, the output from the velocity generator 16 and hence the voltage across potentiometer 206 is of substantially constant frequency and is proportional to the reciprocal of the mass rate of flow. The voltage on the wiper 201 is some fraction of this voltage. If the voltage on wiper 201 is equal to but 180° out of phase with the reference voltage $V_R$ the motor 210 will stop in a position indicative of the mass rate of flow. This can be shown by the following: voltage across potentiometer 206 is proportional to $1/Q$ where Q is mass rate of flow, and the voltage on the wiper is some fraction $\theta$ of this voltage, the voltage on the wiper 201 may be expressed as $$K \times \frac{1}{Q} \times \theta$$

where K is a constant of proportionality. If the voltage which is on the wiper is equal to the reference voltage $V_R$, then $$K = \frac{1}{Q} \times \theta = V_R$$

or $$\theta = \frac{V_R Q}{K}$$

Since $V_R$ and K are constant, $\theta$ is directly proportional to Q.

In the above described circuit, any difference in voltage between the wiper 201 and the reference voltage will cause the amplifier 203 to drive the motor 210 so as to reposition wiper 201 to where its voltage is equal to the reference voltage but 180° out of phase therewith. Then the motor will stop since there is no voltage across the amplifier. The position of the wiper 201 and the motor 210 are then directly proportional to mass rate of flow and an indicator 215 driven by motor 210 may be calibrated linearly to show units of mass rate of flow. If desired wiper 201 could also be arranged to give the indication by placing a scale 230 behind wiper 201.

It is seen by the above discussion that units of mass rate of flow may be read directly in a system such as has been described, that the device is more sensitive at low flow rates and that the need for heavy external power supply has been avoided by the use of a variable speed motor.

Figure 5:
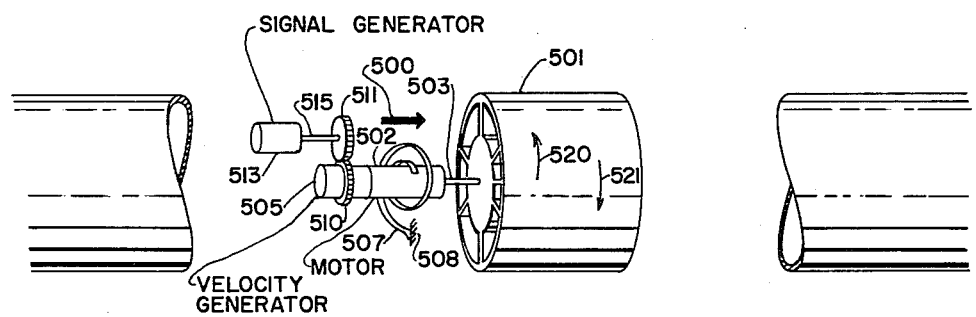
FIGURE 5 is a pictorial and partially sectionalized view of an alternate embodiment of the invention.

FIGURE 5 shows a modification of the present invention wherein the motor itself acts as the torque sensor. Referring to FIGURE 5, a fluid flows in a direction shown by arrow 500. An impeller 501 which is similar to the impeller 21 shown in FIGURE 1, is mounted for rotation about an axis substantially parallel to the direction of the flow 500. A motor 502 suitably mounted for rotation is connected to and drives the impeller 501 by a shaft 503. A velocity generator 505 is also driven by and connected to motor 502. Shaft 503 is integrally connected to the rotors of motor 502 and velocity generator 505. The stators of motor 502 and velocity generator 505 are also integrally connected and react against a spring 507 which is connected thereto and to a suitable fixed member 508, for the purpose of opposing rotation of the motor 502. A gear 510 is attached to velocity generator 505 but it is obvious that the gear could be mounted anywhere as long as it rotates with the motor. A second gear 511 cooperates with gear 510 and drives a signal generator shown as a potentiometer 513 by means of a shaft 515. The purpose of the potentiometer 513 is to give a signal whenever motor 502 is rotated. Of course, any signal generator could be used and the use of gears is not essential. Any signal generator which may be operated on movement of the motor 502 would serve as well.

In the embodiment shown in FIGURE 5, the motor 502 turns the impeller 501 so as to impart an angular velocity to the fluid about an axis parallel to the direction of flow 500. In imparting this velocity to the fluid, a reaction force is created in opposition to the force required to turn the impeller. If the impeller is rotating in a direction shown by arrow 520, then there will be a reaction force on the impeller, in the direction shown by arrow 521. This force is also applied to the shaft 503 and motor 502 and produces a torque tending to turn motor 502 which torque is opposed by spring 507.

Whereas in the embodiment shown in FIGURE 1, the torque applied to the fluid was sensed by a downstream torque sensor, the torque applied to the fluid in the present case is sensed by a torque sensor attached to the motor and thus the number of components is reduced.

By the same circuits shown in FIGURES 2 and 4 the speed of the motor is varied and the indicator will show mass rate of flow or its reciprocal.

Figure 6:
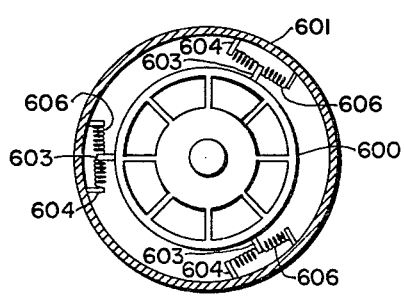
FIGURE 6 is a sectional view of an alternate method of mounting the sensor of the invention.

FIGURE 6 shows an alternate method of mounting the torque sensor of FIGURE 1 or the motor of FIGURE 5. As shown, the turbine 600 is mounted in a housing 601 through which fluid may flow. A plurality of radial extensions 603 are attached to the periphery of turbine 600 at spaced points. Similar extensions 604 extend from the inner surface of housing 601. Spring members 606 are attached to extensions 603 and 604 so that turbine 600 is supported thereby. This also allows limited rotation of turbine 600 while at the same time supporting it. The space between the turbine and the housing has been enlarged for convenience in the drawing. Of course turbine 600 could be replaced by a holder upon which the motor of FIGURE 5 is mounted.

Having described the invention it is obvious to those skilled in the art that many modifications could be made without departing from the scope of the invention and is not to be inferred that the invention is limited by any particular embodiment shown. I wish only to be limited by the following claims.

What I claim is:
1. A mass rate flow meter comprising a fluid tight housing adapted to permit passage of a fluid in a first direction;
  impeller means and force sensing means mounted within said housing;
  movable means mounted in said housing adapted to move said impeller at variable speeds to impart to the fluid passing through said housing an angular speed about an axis parallel to the first direction;
  means mounting said force sensing means for restrained movement under the influence of the force due to the angular speed imparted to the fluid;
  signal generating means responsive to force on said force sensing means connected to said movable means and adapted to vary the speed of said impeller so as to keep substantially constant the force on said force sensing means, the speed of said impeller being indicative of the mass rate of flow of the fluid;

and velocity generator means attached to said movable means and adapted to produce an analogue output signal indicative of the speed of said movable means.

2. A mass rate flow meter comprising a fluid tight housing adapted to permit passage of a fluid in a first direction;
impeller means and force sensing means mounted within said housing;
variable speed motor means mounted in said housing adapted to move said impeller at various speeds to impart to the fluid passing through said housing an angular speed about an axis parallel to the first direction;
means mounting said force sensing means for restrained movement under the influence of the force due to the angular speed imparted to the fluid;
potentiometer means mounted in the housing for providing an output signal, said potentiometer means being responsive to force on said force sensing means, being connected to said variable speed motor means and being adapted to vary the speed of said impeller so as to keep substantially constant the force on said force sensing means, the speed of said impeller being indicative of the mass rate of flow of the fluid; and velocity generator means attached to said variable speed motor means and adapted to produce an analogue output signal indicative of the speed of said variable speed motor means.

3. In a mass rate flow meter:
conduit means;
variable speed motor means mounted in said conduit means for rotation about a first axis, said variable speed motor means having a rotatable output member;
resilient means attached to said variable speed motor means to oppose rotation thereof;
impeller means attached to said rotatable output member so as to be rotated thereby, said impeller means being mounted in said conduit means and adapted to impart an angular velocity to a fluid flowing through said conduit means;
signal generating means associated with said variable speed motor means to produce a signal whenever a reaction force caused by the fluid on said impeller means tends to rotate said variable speed motor means;
means connecting said signal generating means to said variable speed motor means to control the speed thereof so as to keep substantially constant the opposing torque applied by said resilient means; and
velocity generator means attached to said variable speed motor means and adapted to produce an analogue output signal indicative of the speed of said variable speed motor means.

4. In mass rate flow meter apparatus;
conduit means;
rotary impeller means;
variable speed motor means attached to said rotary impeller means and mounted in said conduit means;
rotary torque sensing means mounted in said conduit means and downstream from said rotary impeller means;
biasing means mounted in said conduit means, attached to said torque sensing means nad adapted to bias said torque sensing means toward a first position;
signal generating means including output means mounted in said conduit means and adapted to provide an output signal indicative of the displacement of said torque sensing means from said first position;
means connecting said output means of said signal generating means to said variable speed motor means, said output signal from said signal generating means being adapted to modulate the speed of said variable speed motor to provide a substantially constant torque to said torque sensing means;
transducer means attached to said motor means and adapted to provide an analogue output signal indicative of the speed of said variable speed motor means;
and indicator means connected to receive said output signal from said transducer means.

5. In mass rate flow meter apparatus:
conduit means;
rotary impeller means;
variable speed motor means attached to said rotary impeller means and mounted in said conduit means;
rotary torque sensing means mounted in said conduit means and downstream from said rotary impeller means;
spring means mounted in said conduit means attached to said torque sensing means and adapted to bias said torque sensing means toward a first position;
potentiometer means including output means mounted in said conduit means adapted to provide an output signal indicative of the displacement of said torque sensing means from said first position;
means connecting said output means of said potentiometer means to said variable speed motor means, said output signal from said potentiometer means being adapted to regulate the speed of said variable speed motor for the purpose of keeping the opposing torque provided by said spring means at a substantially constant value;
and velocity generator means attached to said motor means and adapted to provide an output signal indicative of the speed of said variable speed motor means.

References Cited in the file of this patent

UNITED STATES PATENTS

| 2,602,330 | Kollsman | July 8, 1952 |
| 2,660,886 | Milmore | Dec. 1, 1953 |
| 2,714,310 | Jennings | Aug. 2, 1955 |
| 2,814,949 | Bodge | Dec. 3, 1957 |
| 2,832,218 | White | Apr. 29, 1958 |
| 2,914,945 | Cleveland | Dec. 1, 1959 |
| 3,005,341 | Benson | Oct. 24, 1961 |

FOREIGN PATENTS

| 734,992 | Great Britain | Aug. 10, 1955 |